United States Patent [19]

Ayers

[11] Patent Number: 4,526,206
[45] Date of Patent: Jul. 2, 1985

[54] ACTIVATING MECHANISM

[75] Inventor: Ray R. Ayers, Houston, Tex.

[73] Assignee: Shell Oil Company, Houston, Tex.

[21] Appl. No.: 576,594

[22] Filed: Feb. 3, 1984

Related U.S. Application Data

[63] Continuation of Ser. No. 391,637, Jun. 24, 1982, abandoned.

[51] Int. Cl.³ ............................................... F16L 1/04
[52] U.S. Cl. ...................................... 138/89; 73/49.1; 405/170
[58] Field of Search ............... 73/49.1; 92/92; 138/89, 138/90, 91, 93; 200/81 R; 405/158, 169, 170

[56] References Cited

U.S. PATENT DOCUMENTS

| | | | |
|---|---|---|---|
| 3,471,668 | 10/1969 | Wilkes | 200/81 R |
| 3,946,759 | 3/1976 | Mercier | 92/92 X |
| 4,342,519 | 8/1982 | Botrel et al. | 405/169 |
| 4,360,290 | 11/1982 | Ward | 138/89 X |

FOREIGN PATENT DOCUMENTS 1554894  10/1979  United Kingdom ................. 138/89

Primary Examiner—Stephen Marcus
Assistant Examiner—Mark Thronson

[57] ABSTRACT

Propagating buckle chambers, vessels or jugs are employed as in-line plugs in a pipeline. In order to test connectors before flooding the pipeline, the chambers, vessels or jugs are set to trigger at a pressure higher than test pressure.

7 Claims, 4 Drawing Figures

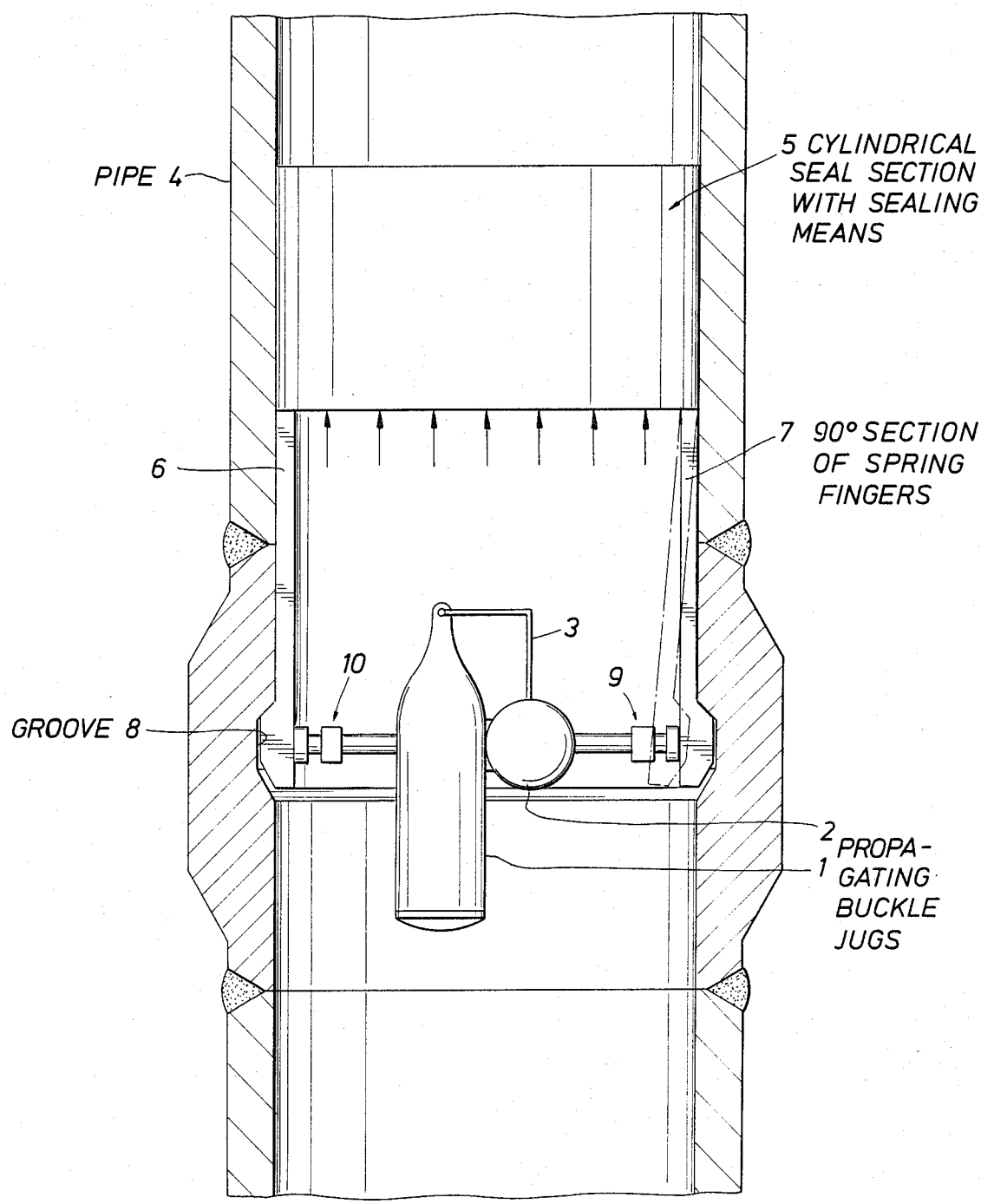

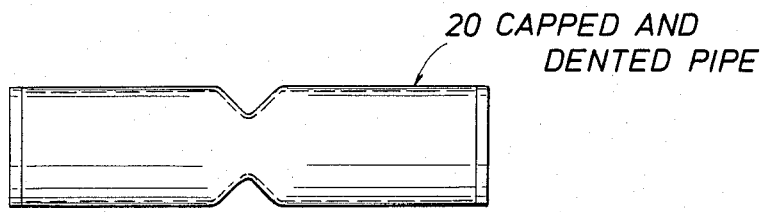

FIG. 2A MECHANICALLY DENT THE CENTER OF A CAPPED STUB PIPE.

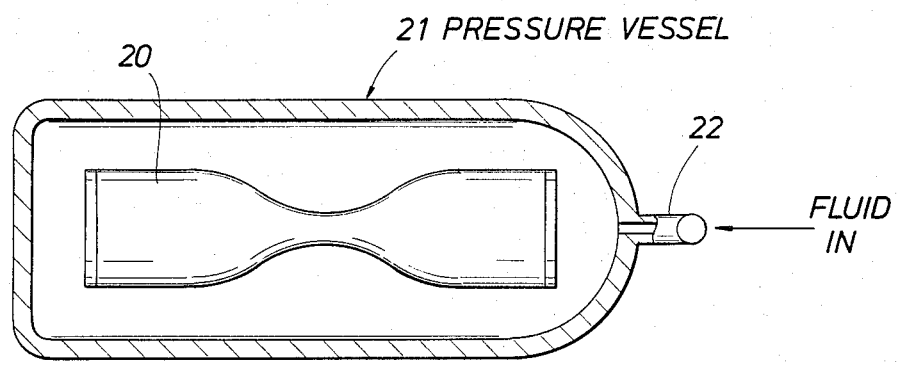

FIG. 2B PLACE PIPE IN PRESSURE VESSEL AND PROPAGATE BUCKLE SOMEWHAT FURTHER BY PUMPING HYDRAULIC FLUID (OR WATER) INTO THE VESSEL. NOTE THE PRESSURE REQUIRED TO PROPAGATE THE BUCKLE: THIS WILL BE RELEASE PRESSURE OF THE RELEASE MECHANISM.

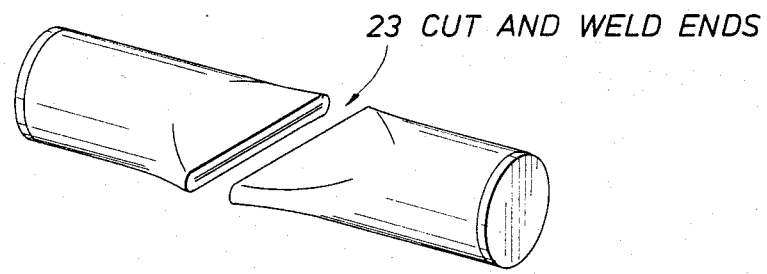

FIG. 2C CUT PIPE IN HALF AND WELD SHUT THE ENDS. ADD FITTINGS AS NECESSARY, MAKING SURE THE PIPE ELEMENT IS PRESSURE TIGHT.

ACTIVATING MECHANISM

This is a continuation of application Ser. No. 391,637, filed June 24, 1982, now abandoned.

BACKGROUND OF THE INVENTION

An activating mechanism may be used to trigger a process when a preselected event occurs, for example, an increase in pressure. The type of device to be triggered may be an in-line plug in a pipeline. It is particularly desirable that the activating mechanism be reliable and inexpensively constructed. It will be apparent from the following description that the present invention completely fulfills these requirements. Related applications Ser. No. 113,985 filed Jan. 21, 1980; Ser. No. 135,835 filed Mar. 31, 1980, now abandoned; No. 218,157 filed Dec. 19, 1980, now abandoned; and No. 218,233 filed Dec. 19, 1980, now abandoned are incorporated herewith.

SUMMARY OF THE INVENTION

An activating mechanism is provided by the present invention which is useful for triggering a process when a preselected event occurs, for example, an increase in pressure.

Preferably, the activating mechanism of the present invention includes a partially buckled, hollow chamber susceptible to further buckling, said further buckling only beginning at a preselected pressure, and a connecting means adapted to be drawn, pulled or retracted toward said hollow chamber when said further buckling occurs, whereupon the motion by said connecting means functions to activate an associated mechanism. More preferably, the associated mechanism is a means for releasing a pipeline plug, and even more preferably, the means for releasing the pipeline plug are spring fingers connected to the plug and engagable with a groove in the interior wall of the pipeline.

BRIEF DESCRIPTION OF THE DRAWINGS

FIG. 1 provides a sectional view showing a propagating buckle chamber or vessel mechanism attached to a plug inside a pipeline.

FIGS. 2A, 2B and 2C show the steps for making a partially buckled chamber or vessel.

DESCRIPTION OF THE PREFERRED EMBODIMENTS

The present invention provides a technique for utilization of a failure mechanism, i.e., the gross flattening of a vessel or chamber under external pressure, to perform useful work through the pressure-actuated drawing, pulling or retracting of a connecting means operatively connected to another device. The nature of the so-called propagating buckle of a cylindrical vessel under pressure is such that there is a large change in shape from, for instance, a round pipe to its fully flattened shape. In this way, the actuation or triggering, of the vessel, can be made to cause a large drawing, pulling or retracting stroke. This large stroke makes it possible to use this type of failure device in a mechanism such as provided by the present invention.

In FIG. 1 of the drawings there is shown one type of mechanism which employs such a device. A cylindrical in-line plug is located within a pipeline and released by means of a propagating buckle chamber or vessel or "jug" attached thereto. Such pipeline plugs are useful in many different operations and it is desirable that they be remotely releasable by reliable means. In conventional offshore pipelay operations, plugs are welded on a pipeline end when the end must be laid on bottom. This can be done as a planned or emergency measure, permitting the pipeline to remain dry and light for subsequent recovery of the pipeline end. The welded plug both seals the pipe end to keep out water and provides the means for transferring tension to the pipe during abandonment and recovery. After recovery the welded plug is cut off. In deep water pipeline construction operations where subsea connections are required, such plugs are needed to keep out water to lighten the pipe and ease alignment operations. Once alignment of the pipe connectors is achieved, the pugs must be removed on bottom in conjunction with the connection operation rather than being brought to the surface for removal. Pipeline plugs also are needed to test such connectors before flooding the pipeline. Such plugs must be capable of withstanding a high test pressure and them remotely releasing without difficulty. From the foregoing, it is clear that plugs are needed in the art which are remotely, and reliably releasable. This need is supplied by the present invention as shown by the embodiment thereof exhibited by FIG. 1.

In FIG. 1, propagating buckle chambers, vessels or "jugs" 1 and 2, connected by means 3, are disposed perpendicularly to each other within a pipe 4. A cylindrical plug 5 is positioned within pipe 4 and has 90-degree sections of spring fingers 6 and 7 attached thereto. The spring fingers seat in a peripheral groove 8 in the interior wall of pipe 4. Propagating buckle jugs 1 and 2 are attached to the spring fingers via turnbuckle connections 9 and 10. Such propagating buckle jugs may be employed to test connectors before flooding the pipeline, the jugs being set to trigger at a pressure higher than test pressure for the connectors. As the pressure increases, the jugs collapse, pulling the spring fingers inwardly as shown and releasing the plugs in the direction shown by the arrows on the side of the plug adjacent the propagating buckle jugs. Accordingly, such remote release of the plug is both effective and reliable.

In FIGS. 2A, 2B and 2C, the steps of making a partially buckled or partially collapsed chamber for jugs 1 and 2 are shown in steps A, B and C. In step A, a chamber such as the capped pipe 20 is mechanically dented in the center; chambers which are triangular, rectangular or elliptical in shape may be employed, and other techniques for denting the chamber may be effected using presses, hammers, etc. In step B, a pressure vessel 21 encompasses the capped and dented pipe 20 and a hydraulic fluid 22 under pressure is passed thereinto. The buckle initiated in step B is propagated by the hydraulic fluid. The pressure required to propagate the buckle is noted since this will become the characteristic collapse pressure of the chamber or trigger. In step C, the pipe is cut in half and welded or otherwise closed at the next section 23. Preferably, a ring hold is placed in the flattened tip of the pipe, making sure the pipe element remains pressure-tight.

What is claimed is:

1. An activating mechanism comprising a partially buckled closed vessel susceptible to substantially buckling into a flattened configuration only beginning after pressure increases to a preselected magnitude, and connecting means adapted to be drawn toward said vessel as said substantially buckling occurs, whereupon the drawing motion by said connecting means functions to activate an associated mechanism, the associated mechanism being a means for releasing a pipeline plug.

2. An activating mechanism comprising a partially buckled closed vessel susceptible to substantially buckling into a flattened configuration only beginning after pressure increases to a preselected magnitude, and a connecting means adapted to be drawn toward said vessel as said substantially buckling occurs, whereupon the drawing motion by said connecting means functions to release a pipeline plug to become movable by fluid pressure inside a pipeline.

3. The activating mechanism of claim 2 wherein the pipeline plug has spring fingers which are engageable with a groove in the pipeline, and the connecting means is operable to draw the spring fingers radially inward, thereby disengaging the spring fingers with the groove in the wall of the pipeline.

4. The activating mechanism of claim 2 wherein at least two collapsed closed vessels are utilized, connected between opposing sets of spring fingers.

5. A method for activating an associated mechanism comprising, providing a partially collapsed buckled closed vessel susceptible to substantially buckling into a flattened configuration only beginning after pressure increases to a preselected magnitude, drawing a connecting means toward said vessel as said substantially buckling occurs, and activating said associated mechanism by the drawing motion of the connection means, the associated mechanism being a means for releasing a pipeline plug, and the partially buckled closed vessel being substantially buckled by fluid pressure in a pipeline.

6. The method of claim 5 wherein the means for releasing the pipeline plug are spring fingers connected to the pipeline plug and engageable with a groove in the interior wall of the pipeline, and the drawing motion of the connecting means pulls the spring fingers radially inward to disengage the spring fingers with the grooves in the pipeline wall and release the pipeline plug.

7. The method of claim 6 wherein the pipeline is flooded by moving the plug through the pipeline with fluid pressure.

* * * * *